United States Patent [19]

Koegeler et al.

[11] Patent Number: 5,157,965
[45] Date of Patent: Oct. 27, 1992

[54] METHOD AND APPARATUS FOR DIAGNOSING INTERNAL COMBUSTION ENGINES

[75] Inventors: Hans-Michael Koegeler; Wilhelm Kunzfeld, both of Graz, Austria

[73] Assignee: AVL Gesellschaft fuer Verbrennungskraftmaschinen und messtechnik mbH Prof. Dr.Dr. h.c. Hans List, Austria

[21] Appl. No.: 631,878

[22] Filed: Dec. 21, 1990

[30] Foreign Application Priority Data

Dec. 22, 1989 [AT] Austria .................................. 2933/89

[51] Int. Cl.⁵ .......................................... G01M 15/00
[52] U.S. Cl. ............................................... 73/116
[58] Field of Search ............................ 73/116, 65, 660

[56] References Cited

U.S. PATENT DOCUMENTS

4,179,922 12/1979 Bouverie et al. .................... 73/116
4,292,670 9/1981 Reid et al. ........................ 73/116 X

*Primary Examiner*—Jerry W. Myracle
*Attorney, Agent, or Firm*—Hill, Van Santen, Steadman & Simpson

[57] ABSTRACT

For single-cylinder evaluation of an internal combustion engine, the respective angular velocity is measured—for respectively defined crank angle positions—at at least one component part of the internal combustion engine, the respective overall moment of inertia is calculated from the design data of the internal combustion engine and, while operating the overall moment of inertia with the angular velocity, the respective overall energy of the internal combustion engine is calculated. A single-cylinder evaluation can then be implemented from the comparison of these overall energies in cylinder-associated crank angle ranges.

21 Claims, 5 Drawing Sheets

Fig. 1A 770 min⁻¹

Fig. 1B 3740 min⁻¹

Fig. 4B

METHOD AND APPARATUS FOR DIAGNOSING INTERNAL COMBUSTION ENGINES

BACKGROUND OF THE INVENTION

The invention is directed to a diagnosis method for internal combustion engines, particularly for multi-cylinder internal combustion engines, whereby measurements of operating characteristics, particularly of operating characteristics associated to a cylinder, are continuously implemented and the torques or powers of the individual cylinders are calculated by evaluating and allocating the measured results. The invention is also directed to a corresponding means for diagnosing internal combustion engines, comprising a measuring instrument for the continuous calculation of cylinder-associated operating characteristics and comprising an evaluation means in communication therewith for evaluation, allocation and display of measured results representing the individual cylinder power.

Methods and apparatus of this general nature are known but are currently usually only employed in the design and development of new internal combustion engines or the parts thereof. What is particularly disadvantageous given previously known apparatus and methods is the fact that the calculation of individual cylinder powers or torques requires separate gas pressure measurements at the individual cylinders. The gas pressure curves dependent on the time or, on the crank angle can then be converted to the sought powers or torques operated with the corresponding design quantities of the internal combustion engine. These gas pressure measurements require a high design or assembly-associated outlay and can be implemented for periodic checking or monitoring of internal combustion engines already in operation only in rare instances since separate indicating bores or the like for the pressure transducers must usually be provided. Overall, this opposes the mass utilization of such diagnosis possibilities.

FEATURES OF THE INVENTION

It is an object of the present invention to improve a method and apparatus of the type initially cited such that the disadvantages are avoided and such that, in particular, individual cylinder evaluations of power or torque can be implemented in a simple, cost-beneficial and nonetheless relevant way. In particular, these evaluations should be possible without applying additional indicating bores or the like to the cylinders of the internal combustion engine, so that routine investigations can also be implemented for mass production engines.

In order to achieve this and other objects, a diagnosis method of the species initially cited is fashioned such that—for respectively defined crank angle positions a) the respective speed or angular velocity is measured at at least one component part of the internal combustion engine;
b) an equivalent moment of inertia I(o) that is dependent on the crank angle is formed from the design data of the internal combustion engine, this equivalent moment of inertia also covering the influence of the oscillating masses; and
c) according to the relationship $E_{gesamt} = E_{kin} + E_{pot}$, the respective overall energy that is stored in the internal combustion engine is approximated by the overall kinetic energy, whereby $E_{kin}$ is calculated according to the relationship $$E_{kin} = \frac{I(\alpha) \cdot \omega^2}{2};$$

and in that d) the individual cylinder torques or powers are calculated from the comparison of these overall energies in cylinder-associated crank angle ranges.

DESCRIPTION OF THE DRAWINGS

Other advantages, objects and features will become more apparent with the teaching of the principles of the invention in connection with the disclosure of the preferred embodiments thereof in the specification, claims and drawings, in which:

DESCRIPTION OF THE PREFERRED EMBODIMENTS

The inventive apparatus for diagnosing internal combustion engines is consequently fashioned such that the measuring instrument comprises a measuring unit for continuous measurement of the speed or angular velocity of the internal combustion engine. It also comprises an allocation unit in communication therewith for allocating the respective measured results to defined crank angle positions of the internal combustion engine. The evaluation means comprises a memory unit in which a respective equivalent moment of inertia $I(\alpha)$ of the internal combustion engine is contained for the defined crank angle positions. The evaluation unit further comprises an operation unit in which the respective, overall energy of the internal combustion engine is calculated, and such that a comparison unit is provided in the evaluation unit, the individual cylinder torques or powers being calculated therein from the comparison of these overall energies in cylinder-associated crank angle ranges. $I(\alpha)$ is thereby calculated with reference to motor data that are input and the calculated value $1(d)$ may be intermediately stored.

Figure 6:
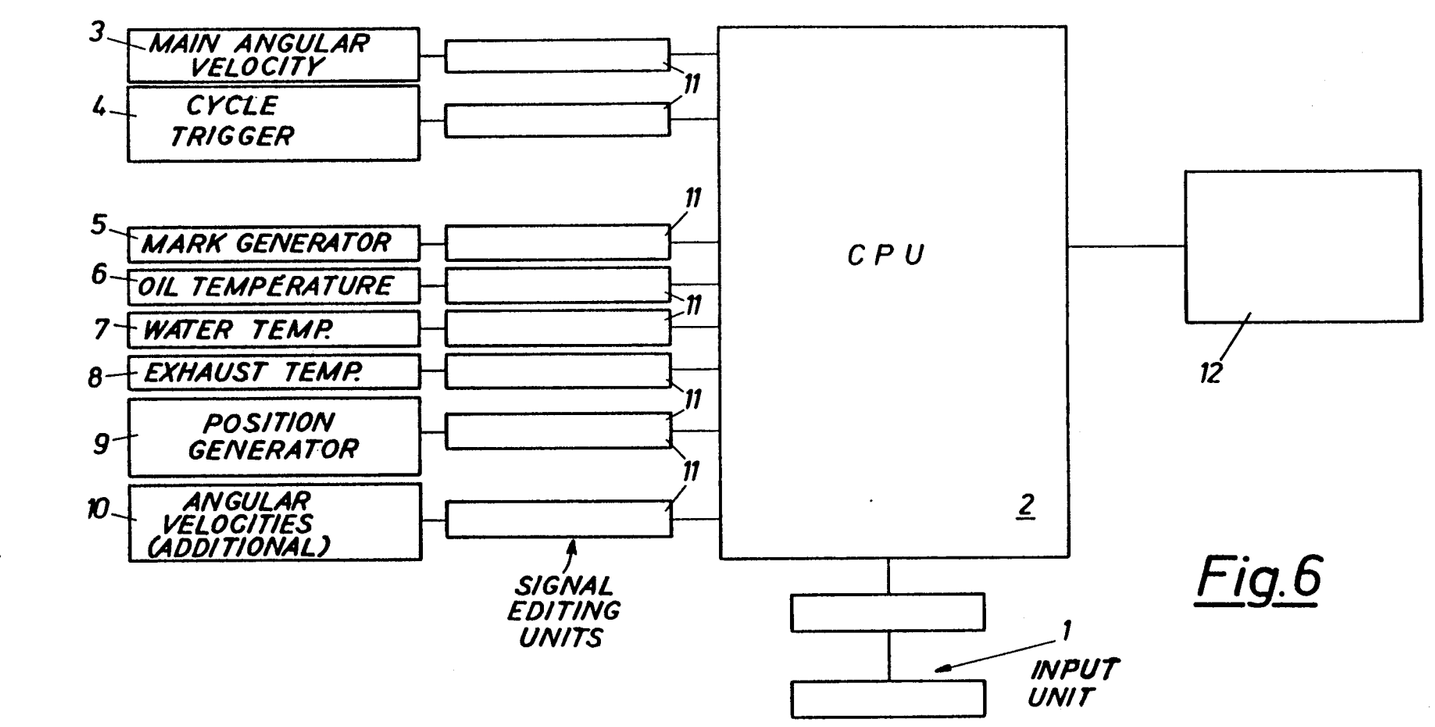
FIG. 6 is a schematic illustration of an arrangement of engine measuring devices used in the practice of the invention.

This "logic unit" for $I(\alpha)$ also covers solutions wherein, according to the block circuit diagram of the inventive means in FIG. 6, various, further signal pick-up or input possibilities are provided with whose assistance $I(\alpha)$ can be calculated, for example in a preceding logic unit. Engine data associated to the motor type—particularly values for $I_o$, l, r, $m_{os}$ or pi(n) as well for the calculation of p, in the deceleration of the engine (see more exact details below)—can be input via the input unit 1. $I(\alpha)$ is calculated for at least one period in the evaluation means 2 from all of these data and is intermediately stored in the memory unit.

As regards sensors, only a measuring unit 3 for continuous measurement of all the speeds or angular velocities of the internal combustion engine as well as a unit 4 (for example, a clamp or transducer or an ignition voltage signal generator) for cylinder recognition for the allocation of the respective measured results of the unit 3 which may be used for the method of the invention. Beneficial but not necessary for the method of the invention, are the following sensors, such as the trigger mark generator referenced 5 in FIG. 6. Beneficial but not necessary for the method of the invention, are the following sensors, such as the oil temperature 6 and a water temperature sensor 7 are provided that are of significance in conjunction with the below-described calculation of the friction. An exhaust temperature sensor 8 and a position generator 9 are provided for the position of the fuel quantity regulator - the mean load with which the internal combustion engine under test is running at the moment can be at least approximately calculated with the signals of these units which are necessary to obtain the absolute cylinder torque during steady state operation.

Possibly, further sensors for calculating the respective curve of the angular velocity at other locations of the engine train, finally, are referenced 10 in general in FIG. 6, these being required for calculating or considering the potential energy.

Units 11 for signal editing, finally, are entered in the connection of all of the measuring units or sensors to the evaluation means 2; output units such as picture screen, printer, data carrier, interfaces, etc., that follow the evaluation unit 2 are referenced 12.

For evaluating individual cylinders in view of torque or power, respectively, the invention thus proceeds on the basis that only a speed or angular velocity that is relevant to the respective dynamic conditions at the crank mechanism of the internal combustion engine need be taken dependent on the crank angle position of the internal combustion engine, this having to be, in turn, operated with the respective overall moment of inertia $I(\alpha)$ related to the crank angle for the respective, overall kinetic energy stored in the engine. In cylinder-associated crank angle ranges of the overall energy entered over the crank angle, this can then be allocated without further ado to the individual, main originating cylinders, so that the characteristics of the individual cylinders can be calculated on the basis of corresponding comparisons.

As regards constant values associated to the motor type, only the moment of inertia of all rotating machine parts (reduced to the crank shaft speed), the connecting rod ratio (connecting rod length and stroke) as well as the sum of the oscillating masses per cylinder need thereby be known. Fundamentally, the method or the corresponding means of the invention are conceived for individual cylinder evaluation in full load acceleration (acceleration with a fully-open throttle in a defined speed range, preferably (but not necessarily) without external load of the internal combustion engine). As a result of the high precision—particularly in the low speed range, it is also possible to diagnose the differences between the cylinders during idling. Over and above this, it is also fundamentally possible to identify the mechanical loss moment of the motor during the motor deceleration or to calculate the curve of the internal individual cylinder torque during full load acceleration as well.

What is fundamentally valid is that, for instance, the effective individual cylinder torque curves result from the increase in stored kinetic energy $E_{kin}$ due to the action of a cylinder. When the overall internal combustion engine is considered to be a mechanical, open system, then the following energy balance can be established:

$$\Delta(E_{kin} + E_{pot}) + \text{Wload} = \text{Wi} - \text{Wf} \qquad \text{Eq. 1a}$$

or for the freely running motor:

$$\Delta(E_{kin} + E_{pot}) = \text{Wi} - \text{Wf} \qquad \text{Eq. 1b}$$

thereby valid are:
Wi: mechanical work of the gas pressures
Wf: mechanical work of the loss moments
Wload: mechanical work output to the outside (given the freely running engine, Wload=0 applies)
$E_{kin}$: kinetic energy stored inside the motor. It is a function of $\psi$ and $\alpha$.
$E_{pot}$: potential energy stored inside the motor. Energy is also briefly stored due to the revolution or elongation of elastic motor elements. This part does not effect the $\psi$ curve until higher speeds. The energy that is stored due to the geodetic height of the oscillating masses is also to be classified here.

These relationships are valid for arbitrary differential angles.

It is standard for internal combustion engines to calculate Wi or Wf over a motor cycle and to refer it to the working For a 1-cylinder engine, equation 1 can be written in standard form given consideration of a crank angle interval of 720°:

$$pe = pi - pf \qquad \text{Eq. 1c}$$

pe: brake mean effective pressure (BMEP)

$$pi = \frac{1}{Vh} \cdot \int_{-\pi}^{+\frac{3\pi}{2}} p_{\text{gas}} \cdot dV$$

indicated mean effective pressure (FMEP)
Vh: volume of a cylinder
pgas: pressure curve in the combustion chamber of a cylinder (this is usually measured with pressure sensors that are applied in individual indicating bores)

or, respectively, $$pf = \frac{1}{Vh} \cdot \int_{-\pi}^{+\frac{3\pi}{2}} Mf \cdot d\alpha$$

frictional mean effective pressure (IMEP)
Mf: torque of all mechanical friction losses in the motor in terms of its effect on the flywheel
$\alpha$: angular position of the crank shaft These values are valid for a respective cylinder. The overall energy stored in the motor, however, is influenced in common by all cylinders. However, they have different positions in the work process.

Figure 2A:
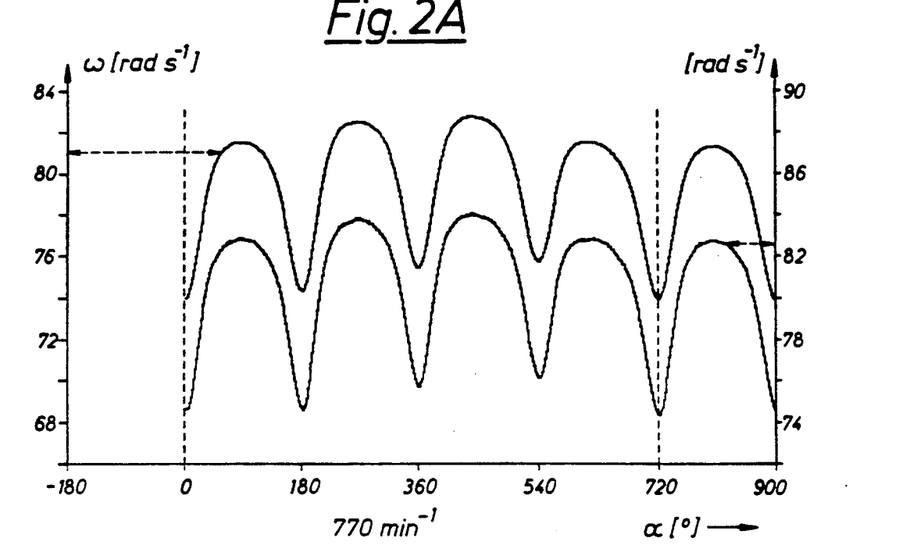
Figure 2B:
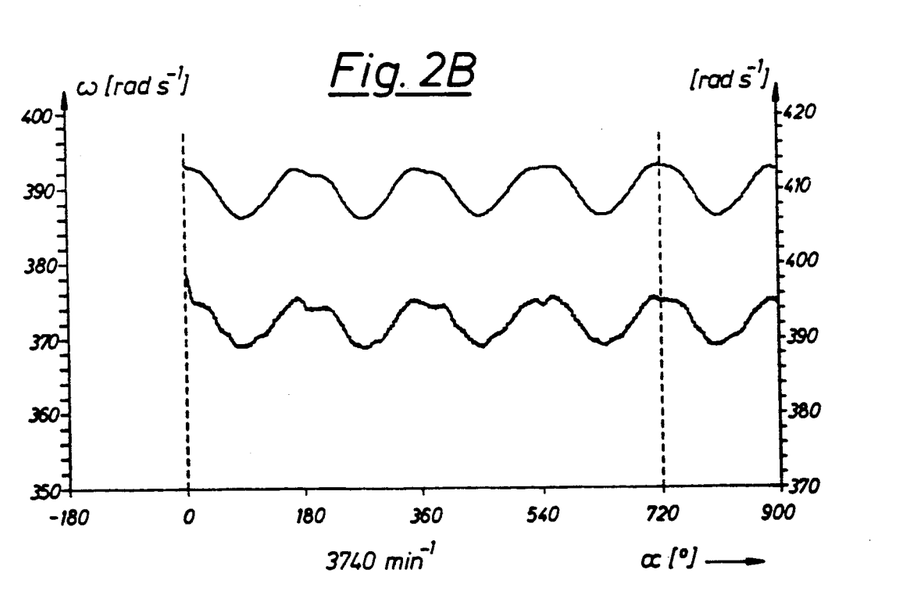

For a 4-cylinder in-line motor with a 4-cycle principle, for example, the difference of the stored energy is therefore implemented in an interval of $\Delta\alpha = 720/4 = 180°$ KW. "Like shown in FIG. 2a mixed mean effective pressures" thereby derive that are fundamentally influenced by all cylinders but mainly by that cylinder that is then just situated in a critical part of the high-pressure loop. These "mixed mean effective pressures" are identified with an *. ("j" is the index of the cylinder under consideration)

$$pe^*_j = \frac{1}{Vh} ((E_{kin} + E_{pot})_{(\alpha j)} - (E_{kin} - E_{pot})_{(\alpha j - 180)}) \qquad \text{Eq. 2a}$$

$$pi^*_j = pe^*_j + pf^*_j \qquad \text{Eq. 3a}$$

Operating characteristic that, under defined preconditions, exactly corresponds (see below) to a "break mean effective pressure" or to "internal mean pressure" of a defined cylinder taking the motor friction into consideration can thus be derived from the curve of the level of energy.

In tests implemented up to now, it has been shown that the influence of the torsional vibrations ($E_{pot}$) can be left out of consideration when calculating the energy level curve, whereby noticeable deviations from the reference values defined with quartz pressure transducers did not arise until higher speeds.

Valid in this case is:

$$pe^*_j = \frac{1}{Vh} ((E_{kin})_{(\alpha j)} - (E_{kin})_{(\alpha j - 180)}) \qquad \text{Eq. 2b}$$

In the first step in the mensurational method of "energy level evaluation", $\omega$ is measured at a location at which the moment of inertia of the engine is optimally concentrated, preferably at the flywheel. In addition, a cylinder in which a combustion is just occurring is also detected, preferably by a separate evaluation unit having an injection line pressure signal or an ignition voltage signal. The exact allocation between the $\omega$ curve and the crank angle $\alpha$ preferably ensues with a trigger mark. Later, the $\omega$ curve that is directly calculated from the measured data is preferably smoothed. When no trigger mark is present, the allocation of the crank shaft angle ($\alpha$) to the $\omega$ curve can also be undertaken with reference to the relative minimums in the $\omega$ curve. During idling, the relative minimums of the $\omega$ curve always lie in the immediate proximity of TDC.

With this information, the kinetic energy of the oscillating masses can also be taken into consideration and the curve of the level of energy can be calculated.

Of seven fundamental differentiation methods, that was selected wherein the best coincidence between $pe^*_j$ and the corresponding $pe_j$—identified, for example, with quartz pressure transducers—was capable of being achieved.

The acquisition of the speed preferably ensues via the teeth of the gear rim that are used as angle marks. The angular velocity derives from $$\omega = \frac{\Delta \alpha}{\Delta t}$$

$\Delta \alpha (=$, for example, 3.33° given, for example, 108 teeth)
$\Delta t$ time difference between two teeth.

A data acquisition means interpolates within these angular steps, for example to a measuring resolution of 1° KW.

The gear rim of the flywheel, however, has certain manufacturing tolerances and the time measurement is also implemented in discrete steps (for example, of whole $\mu$sec). A high-frequency noise on the $\omega$ curve usually derives therefrom.

Figure 1A:
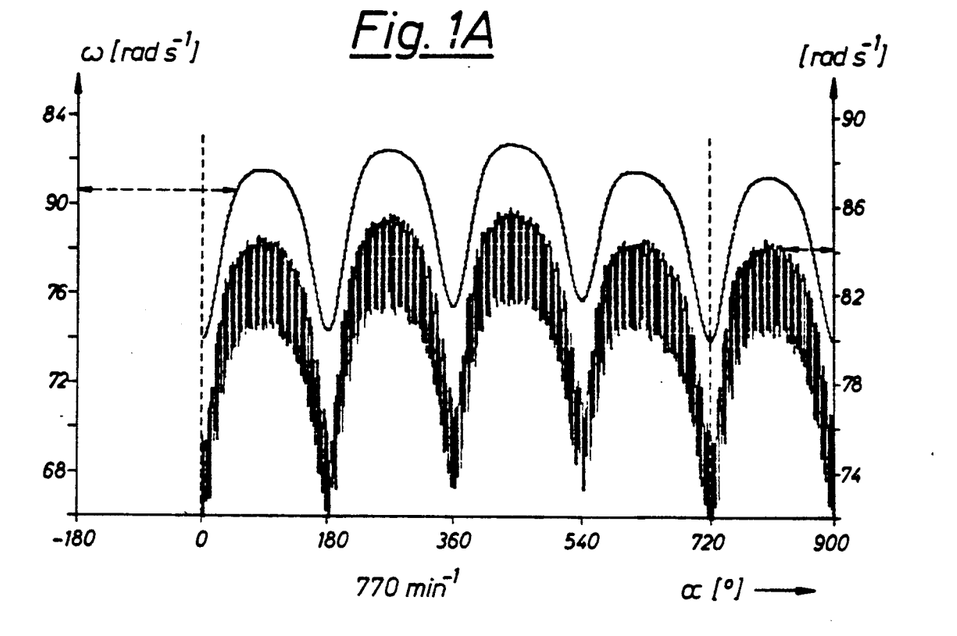
FIGS. 1A, 1B, 2A, 2B, 3, 4A, 4B and 5 are graphic presentations of engine performance outputs (the individual Figures will be more specifically described in the details of the disclosure)
Figure 1B:
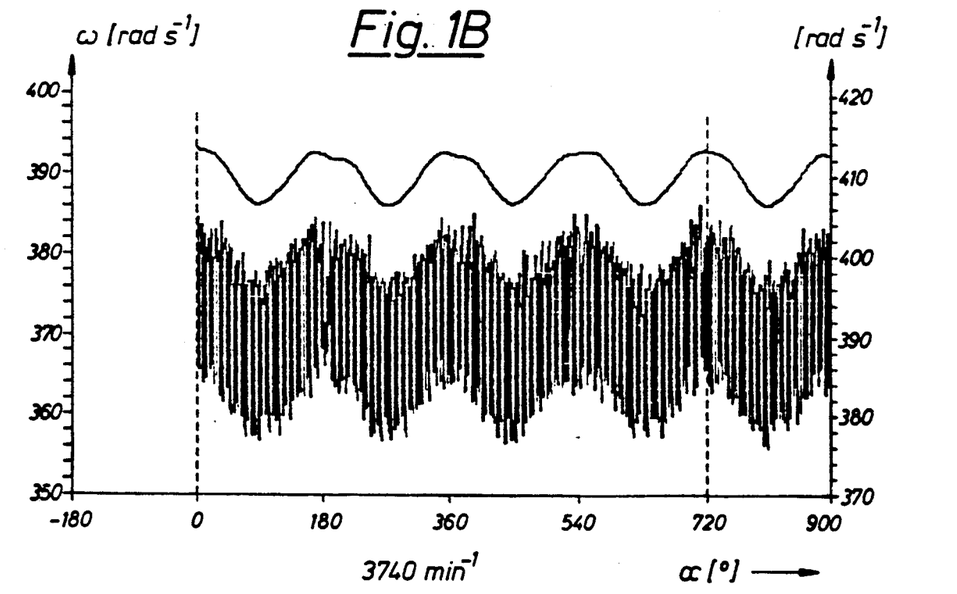

FIG. 1 shows an example of the $\omega$ curve over the crank angle $\alpha$ as directly presented from the registered measured data in comparison to an $\omega$ curve calculated, for example, from the gas pressures in the cylinders registered in a conventional way (1A at a speed of 770/min; 1B at 3740/min). After a smoothing, for example with the assistance of sliding averaging (over $\pm 5$ points), a curve that is already greatly improved derives. After, for example, a second smoothing of the same type, the $\omega$ curve can be utilized for evaluation with the assistance of the "energy level algorithm" (in this respect, see FIGS. 2–2A again for 770/min; 21B 2B for 3740/min).

The angular position of the top dead centers can then be calculated during idling from the $\omega$ curve; for a practically investigated internal combustion engine, the relative minimum of the $\omega$ curve in the good condition always lay at 1° KW following TDC.

Even in the poorer condition, this minimum lay within $+1$ through $+4°$ KW following TDC, even though cylinder 3, for example, was already operated with approximately 33% of the full load and the cylinder 4 was dragged and, thus, one can no longer directly mention idling. An appropriate evaluation means can thereby recognize or regulate the TDC position in this way in idling as well. In the implemented measurements, the TDC position was acquired with a trigger mark. When the TDC position of a cylinder is known, then the kinetic energy stored in the motor can be calculated. Taking the oscillating masses into consideration thereby ensues on the basis of the introduction of an angle-dependent equivalent moment of inertia that takes the influence of the oscillating masses into consideration. Generally valid for an n-cylinder reciprocating piston engine;

$$I_{(\alpha)} = I_o + I_{os(\alpha)}$$

$I_o$... moment of inertia of all rotating motor parts
$I_{os}$... imaginary part of the moment of inertia for taking the oscillating masses into consideration.
Formulation:

$$I_{os} \cdot \frac{\omega^2}{2} = \sum_{j=1}^{n} mos_j \cdot \frac{\dot{x}_j^2}{2}$$

or, respectively, formulation for the cylinder $j$:

$$I_{os_j}(\alpha_j) \cdot \frac{\omega^2}{2} = mos_j \cdot \frac{\dot{x}_j^2(\alpha_j)}{2}$$

$$I_{os_j}(\alpha_j) = mos_j \frac{\dot{x}_j^2(\alpha_j)}{\omega^2}$$

$$\dot{x}_j(\alpha_j) = \frac{dx(\alpha_j)}{d\alpha_j} \cdot \omega$$

$$x_j(\alpha_j) = l + r - (l \cos\beta_j + r \cos\alpha_j)$$

with: $\sin\beta_j = \frac{r}{l} \sin\alpha_j = \lambda \cdot \sin\alpha_j$ and: $\cos^2\beta_j + \sin^2\beta_j = 1$ $$\rightarrow \cos\beta_j = \sqrt{1 - \lambda^2 \sin^2\alpha_j}$$

$$x_j(\alpha_j) = r(1 - \cos\alpha_j) + l(1 - \sqrt{1 - \lambda^2 \cdot \sin^2\alpha_j})$$

$$\dot{x}_j(\alpha_j) = \omega \left( r \cdot \sin\alpha_j + \frac{l \cdot \lambda^2 \cdot \sin\alpha_j \cdot \cos\alpha_j}{\sqrt{1 - \lambda^2 \cdot \sin^2\alpha_j}} \right)$$

$$Ios_{j(\alpha j)} = mos_j \cdot \left( r \cdot \sin\alpha_j + \frac{l \cdot \lambda^2 \cdot \sin\alpha_j \cdot \cos\alpha_j}{\sqrt{l - \lambda^2 \cdot \sin^2\alpha_j}} \right)^2$$

Figures 3, 5:
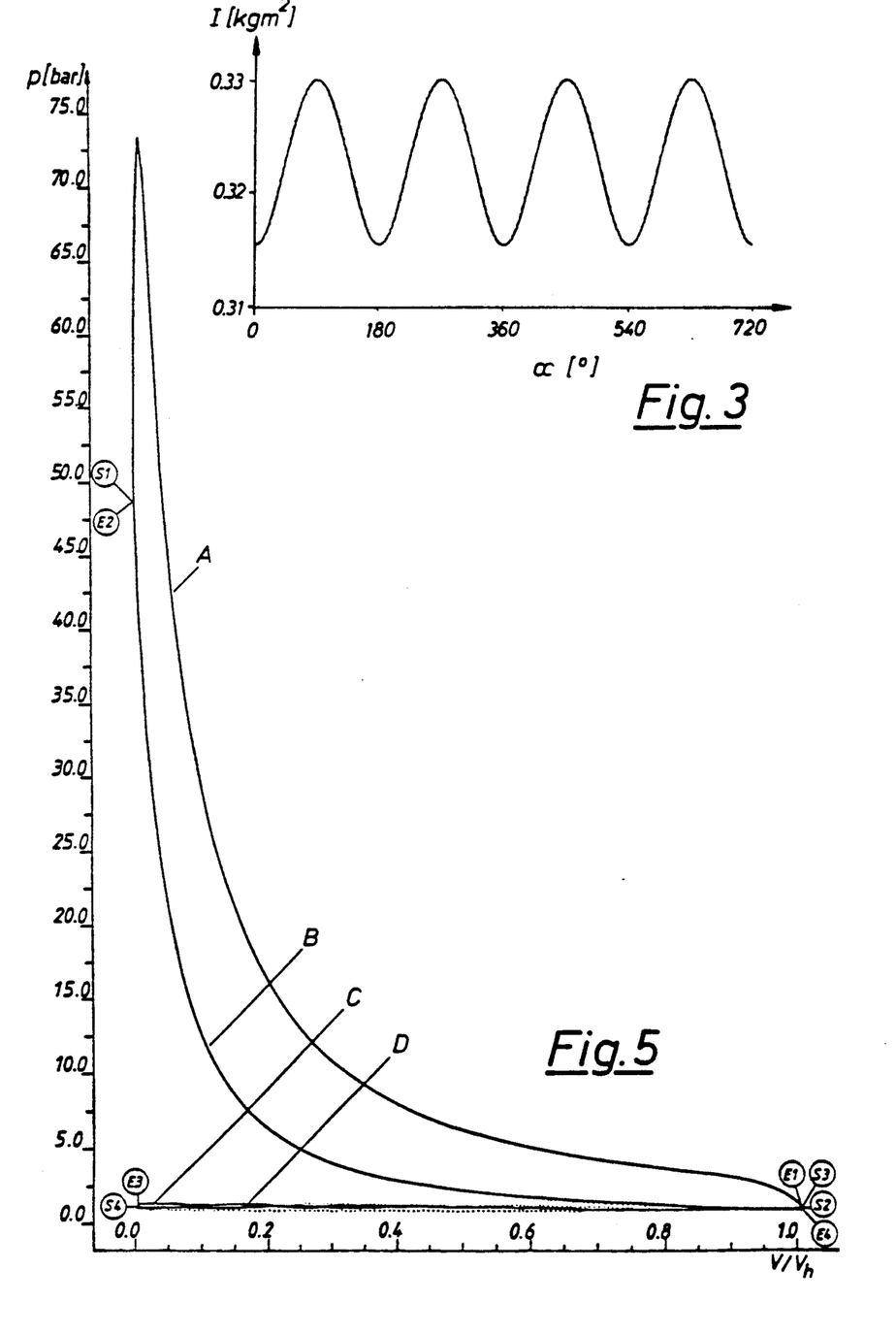

For an n-cylinder reciprocating piston engine, the sum of all oscillating inertial masses acts taking the respective phase relation of the crank throw $\alpha_j$ into consideration $$Ios_{(\alpha)} = \sum_{j=1}^{n} \left[ mos_j \cdot \left( r \cdot \sin\alpha_j + \frac{l \cdot \lambda^2 \cdot \sin\alpha_j \cdot \cos\alpha_j}{\sqrt{l - \lambda^2 \cdot \sin^2\alpha_j}} \right)^2 \right]$$

mos = oscillating mass per cylinder
r = half stroke
l = connecting rod length $\lambda = r/l$ $\alpha_j$ = crank angle of the cylinder j FIG. 3, for example, shows the curve of this moment of inertia I($\alpha$) of a specific engine as a function of the crank angle $\alpha$. It is independent of the speed.

The energy level curve derives from $$E_{kin(\alpha)} I_{(\alpha)} \cdot \omega^2 / 2 \quad \text{Eq. 4}$$

Figure 4A:
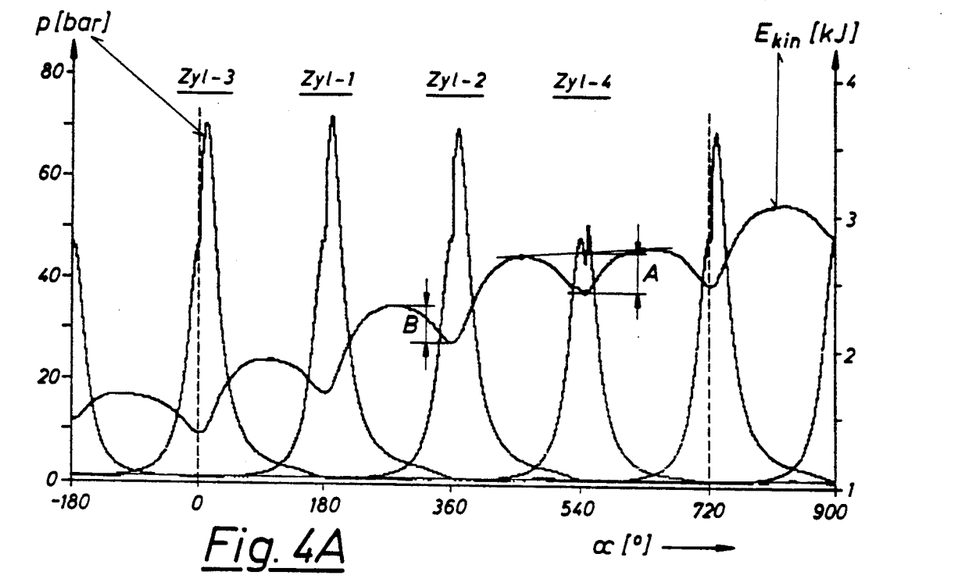
Figure 4B:
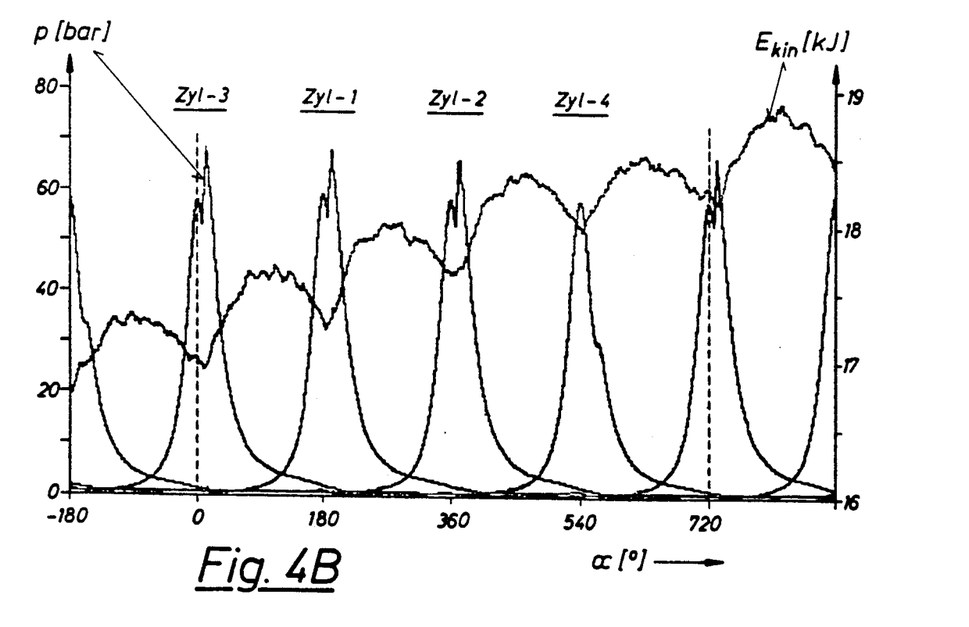

FIG. 4 shows an example of this energy level curve in comparison to the cylinder pressure curves p measured in a conventional way, namely again at a low speed (FIG. 4A) and at a high speed (FIG. 4B). The effect of the individual cylinders can be recognized from the differences in the energy level curve.

The differentiation can thereby fundamentally ensue in seven different ways:
1. Observation of the maximums
    1.a) difference between two successive, relative maximums
    1.b) difference between the one maximum and the energy level value lying 180° KW before it
    1.c) difference between a maximum and the energy level value lying 180° KW later
2. Observation of the minimums
    2.a) difference between two successive, relative minimums
    2.b) difference between one minimum and the energy level value lying 180° KW earlier
    2.c) difference between one minimum and the energy level value lying 180° KW later
3. Comparison of the Energy Level Values in the top Dead Centers Whereas methods 1a) through 1c) yielded noticeably less precise results, methods 2a) through 2c) and 3 are approximately just as exact. The best coincidence was achieved with method 2), which is used in the example for the equation 2b.

The said "mixed mean effective pressures" pe*$_j$ or pi*$_j$ can be presented in the following way:

During the identification of the individual cylinder torque —for example of cylinder 1—a 4-cylinder in-line engine is in the following situation (ignition sequence: 1, 2, 4. 3)
    in compression: cylinder 2,
    in expansion: cylinder 1,
    exhausting: cylinder 3, and
    intaking: cylinder 4.

All pressure curves influence the revolution of the flywheel in common.

The measured cylinder pressure curves for this example are shown in FIG. 5 in the form of a p-V diagram. The pressure curve for the entire cycle of cylinder 1 is entered dashed. Further, the range from S1 through E1 denotes the start and end of the gas pressure influence of cylinder 1; the range from S2 through E2 denotes start and end of the gas pressure influence of cylinder 2; S4 through E4 denotes start and end of the gas pressure influence of cylinder 4; and S3 through E3 denotes start and end of the gas pressure influence of cylinder 3. The expansion stroke of cylinder 1 is referenced A; the compression stroke of cylinder 2 is referenced B; the exhaust stroke of cylinder 3 is referenced C; and the intake stroke of cylinder 4 is referenced D.

Except for small differences in the gas exchange, one can see that the curve of cylinder 1 entered dashed coincides with the corresponding parts of the pressure curves of cylinders 2, 3 and 4. If they were absolutely identical, then pi* would equal pi in accord with the definition. In the 1-cylinder torque calculation under consideration here with the assistance of the energy level method, it is thus assumed that the compression pressure curve is similar for all cylinders
    an that no great differences between the individual cylinders exist in the gas exchange.

This so-called energy level method is also in the position to calculate the effective, mixed mean pressure (pe*) of each and every individual cylinder in every motor cycle during the motor deceleration:

$$pe^*_j = pi^*_j - pf^*_j \quad \text{Eq. 3a}$$

pi*$_j$ is negative in the motor run-down and is mainly composed of the losses in the gas exchange and the thermal losses of the walls during the high-pressure loop. In the frame work of an investigation of motor friction, pi*$_j$ for every cylinder j can be calculated as a function of the motor speed and of the motor temperature in a one-time form associated to the motor type. The curve of the friction mean effective pressure pf*$_j$ during the motor deceleration can be calculated motor-associated with this information.

The energy level method fundamentally supplies pe*$_j$ or Me*. When pf*$_j$ or Mf*$_j$ is calculated as a function of the speed in the motor deceleration, then pi*$_j$ or Mi*$_j$ in a following motor acceleration or in idling as well can be calculated:

$$Mi^*_j = Me^*_j + Mf^*_j \quad \text{Eq. 3b}$$

The load-dependency of Mf is thereby again left out of consideration, this having usually proven definitely allowable. With the assistance of Mi*, for example, the injected fuel quantity can then be evaluated without the influence of the motor friction.

A difference that represents a part of the compression work or a part of the expansion work of a cylinder (for example, FIG. 4A amplitude A) can also be formed from the energy level curve. When no combustion is occurring, i.e. during deceleration or given a dragged motor, this measure can be utilized very well for the comparison of the relative compression of the cylinders. In case of combustion, as well, a check to see whether the condition of uniform compression is met can be continuously undertaken with the amplitude B (FIG. 4A).

The operation started up to now fundamentally refers to internal combustion engines running without load. The case of the loaded machine with $W_{load}$, however, is already taken into consideration in Equation 1a where $W_{load}$ is understood as the mechanical output work during the contemplated crank angle interval. Measurements at loaded machines have confirmed that the $\omega$ curves present themselves in a corresponding form.

whereby the curve $\omega(t)$ is measured at each of these locations k. ($E_{kin}$ thereby also changes.)

The spring constance of the elastic connector elements assumed to be free of mass must be known in order to be able to completely calculate the level of energy.

Dampings need not be formulated since the corresponding losses are included among the frictional loss and thus no longer belong to the level of the stored energy:

Elastic formulation:
$\alpha_1 \quad \alpha_2 \quad \alpha_3 \quad \quad \alpha_n$
$\omega_1 \quad \omega_2 \quad \omega_3 \quad \quad \omega_n$ $$I(\alpha) = \sum_{i=1}^{n} I_i(\alpha)$$

$$E_{ges}(\alpha_1) = E_{kin} + E_{pot}\, c = \sum_{i=1}^{n} I_{i(\alpha 1)} \cdot \frac{\omega_1^2}{2} + \sum_{i=2}^{n} C_{i-1,i} \frac{(\alpha_i - \alpha_{i-1})^2}{2} \ldots G1.8$$

The relative compression or, torque or power share of a cylinder can thus be calculated for the loaded engine in the same way. When, over and above this, the mean load of the machine is also approximated—for example, from the exhaust gas temperature or from the accelerator position in combination with the speed and a corresponding, engine-associated characteristics field that was calculated once on a motor test bench—then the effective single-cylinder torque or the effective single-cylinder power can be absolutely recited:

$$pe^*_j = \frac{1}{Vh} \cdot (E_{kin(\alpha j)} - E_{kin(\alpha j - \Delta\alpha)} + W_{load}) \qquad \text{Eq. 2c}$$

Of course, the kinetic energy of the entire drive train is thereby to be taken into consideration in $E_{kin}$ The potentially stored energy is likewise taken into consideration in the following manner by calculating the value $pe^*_j$ from the overall energy $E_{gesmt}$ stored in the engine, where $E_{gesmt} = E_{kin} + E_{pot}$ The sum of $E_{pot}$ h (as a consequence of the geodetic height of the oscillating masses) and $E_{pot}$ c (the spring-loaded energy in the elastic machine elements that is not yet taken into consideration) is then acquired under $E_{pot}$:

$$E_{POT}\,h = g \cdot \sum_{j=1}^{n} \cdot mos_j \cdot h_{j(\alpha j)} \qquad \text{Eq. 7}$$

When the share of the geodetic height of the oscillating masses is influential, then $$E_{pot}\,h = g \sum_{j=1}^{n} mos_j \cdot h_{j(\alpha j)} \qquad \text{Eq. 6}$$

$h_j$ = geodetic height of the centers of gravity of the oscillating masses in the cylinder j is calculated in the energy level curve for the n-cylinder reciprocating piston engine.

The consideration of torsional oscillations in the internal combustion engine or in the entire drive train preferably ensues by splitting the angle-dependent moment of inertia of the engine into two through a finite plurality (n) of representative sub-moments of inertia,

We claim as our invention:

1. A diagnosis method for internal combustion engines, particularly for multi-cylinder internal combustion engines, whereby measurements of operating characteristics, particularly of cylinder-associated operating characteristics are continuously implemented and the single-cylinder torques or powers are calculated by evaluation and allocation of the measured results, comprising the steps of:
   (a) measuring the respective angular velocity at at least one component part of an internal combustion engine;
   (b) forming an equivalent moment of inertia $1(\alpha)$ dependent on crank angle from the design data of the internal combustion engine, this equivalent moment of inertia also covering the influence of the oscillating masses;
   (c) calculating by approximation and according to the relationship $E_{gesmant} = E_{kin} + E_{pot}$, the respective overall energy that is stored in the internal combustion engine, where $E_{pot}$ is neglected such the $E_{gesmant}$ is approximated by the overall kinetic energy, where $E_{pot}$, which is neglected, is the energy stored in the elastic elements and in the changing geodetic height, and where the kinetic energy $E_{kin}$ is calculated according to the relationship $$E_{kin} = 1(\alpha) \cdot \omega^2 / 2;$$

(d) calculating the single-cylinder torques from the comparison of these overall energies in cylinder-associated crank angle ranges.

2. A diagnosis method according to claim 1 for an internal combustion engine comprising a flywheel arranged at an end of the crank shaft and a starter gear rim, wherein the step (a) is further defined as measuring at the gear rim of the flywheel by inductive proximity non-contacting measurement.

3. A diagnosis method according to claim 1 and further defined as assigning the measured angular velocity to a respective crank angle by sensing a crank shaft trigger mark and a cycle trigger mark.

4. A diagnosis method according to claim 1 and further defined as calculating the appearance of characteristic crank angle positions, including, the top dead center (TDC) positions from the curve of the angular velocity.

5. A diagnosis method according to claim 1 wherein: the step (a) is further defined as measuring the angular velocity in the full-load acceleration of the freewheeling internal combustion engine.

6. A diagnosis method according to claim 5 and further defined as calculating the single-cylinder torques during acceleration and deceleration whose sum at least approximately corresponds to the internal motor torque.

7. A diagnosis method according to claim 1 and wherein:
the step (a) is implemented in that the cylinder-associated engine friction is isolated in the deceleration of the freewheeling internal combustion engine.

8. A diagnosis method according to claim 7 wherein: the step (a) is implemented by calculating and additionally considering losses in the gas pressure curve typical of the internal combustion engine for that type of engine in bench test.

9. A diagnosis method according to claim 1 wherein the step (a) is implemented at a freewheeling internal combustion engine during arbitrary operating conditions.

10. A diagnosis method according to claim 1 and further comprising the step of calculating the average motor load and further calculating of the absolute values of the single-cylinder torques.

11. A diagnosis method according to claim 1 and further defined by editing the measured values for angular velocity before further processing, preferably smooth in their chronological curves.

12. A diagnosis method according to claim 1 wherein the crank angles are defined at cranking of positions at a spacing of 1°.

13. A diagnosis method according to claim 1 wherein the stored overall energy in the step is defined as $E_{gesamt} = E_{kin} = E_{pot}$, whereby the torsional vibration behavior of the engine is taken into consideration in a more accurately calculated kinetic energy $E_{kin}$ based on several angular velocities and the spring laded energy of the elastic elements $E_{pot}$.

14. A diagnosis method according to claim 13, wherein: including the geodetic height of the oscillating masses in determining the value $E_{pot}$.

15. A diagnosis method according to claim 1 and further defined by calculating the operating characteristics of the relative compression from the curve of the stored energy and taking these characteristics into consideration the comparison according to the step (d).

16. An apparatus for the diagnosis of internal combustion engines, comprising a measuring instrument for the continuous calculation of cylinder-associated operating characteristics and comprising an evaluation means in communication therewith for evaluation, allocation and display of measured results representing the single-cylinder power, characterized in that the measuring instrument comprises a measuring unit for continuous measurement of the angular velocity of the internal combustion engine as well as an allocation unit in communication therewith for allocation of the respective measured results to defined crank angle positions of the internal combustion engine; the evaluation means comprising a memory unit in which a respective equivalent moment of inertia $I(\alpha)$ of the internal combustion machine is contained for the defined crank angle positions; the evaluation unit further comprising a logic unit wherein the respective, overall energy of the internal combustion engine is calculated; and a comparison unit provided in the evaluation unit in which the single-cylinder torques or powers are calculated from the comparison of these overall energies in cylinder-associated crank angle ranges.

17. An apparatus according to claim 16 for internal combustion engines having a flywheel arranged at an end of a crank shaft and comprising a starter gear rim having teeth, characterized in that an angular velocity sensor interacting with the teeth, such as an inductive proximity sensor operating in non-contacting fashion is arranged in the region of the gear rim of the flywheel of the internal combustion engine under test and is connected to the measuring unit.

18. An apparatus according to claim 17, characterized in that a TDC sensor is additionally provided at the flywheel and is connected to the allocation unit.

19. An apparatus according to claims 16 characterized in that an editing unit for the measured signal is inserted between at least one of the measuring unit or the allocation unit and the evaluation means.

20. An apparatus according to claim 16 characterized in that the internal combustion engine under test is connected to a load arrangement for charging with a preferably respectively known load.

21. An apparatus according to claim 16 characterized in that a separate arrangement for calculating the relative compression of the individual cylinders is provided at the internal combustion engine and is connected to the evaluation unit.

* * * * *